United States Patent [19]

Heinemann

[11] 4,245,620

[45] Jan. 20, 1981

[54] SOLAR HEAT COLLECTOR

[75] Inventor: Klaus W. Heinemann, Sunnyvale, Calif.

[73] Assignee: Alten Corporation, Mountain View, Calif.

[21] Appl. No.: 829,958

[22] Filed: Sep. 1, 1977

[51] Int. Cl.³ .............................................. F24J 3/02
[52] U.S. Cl. ................................. 126/447; 126/448
[58] Field of Search .............. 126/270, 271, 450, 448, 126/441, 452, 445, 446, 447; 237/1 A; 165/171

[56] References Cited

U.S. PATENT DOCUMENTS

| | | | |
|---|---|---|---|
| 1,338,644 | 4/1920 | Arthur et al. | 126/271 |
| 3,089,670 | 5/1963 | Johnson | 126/441 |
| 3,310,102 | 3/1967 | Trombe | 126/451 |
| 3,981,294 | 9/1976 | Deminet et al. | 126/271 |
| 4,015,582 | 4/1977 | Liu et al. | 126/271 |
| 4,015,583 | 4/1977 | Laing | 126/271 |
| 4,078,548 | 3/1978 | Kapany | 126/441 |
| 4,084,574 | 4/1978 | Golay | 126/271 |
| 4,085,667 | 4/1978 | Christianson | 126/270 |
| 4,091,793 | 5/1978 | Hermann et al. | 126/441 |
| 4,114,597 | 9/1978 | Erb | 165/172 |
| 4,116,224 | 9/1978 | Lupkas | 126/271 |

FOREIGN PATENT DOCUMENTS

| | | | |
|---|---|---|---|
| 2546619 | 4/1976 | Fed. Rep. of Germany | 126/271 |
| 2522154 | 11/1976 | Fed. Rep. of Germany | 126/271 |
| 235563 | 2/1926 | United Kingdom | 126/446 |

OTHER PUBLICATIONS

V. D. Bevill and H. Brandt, "A Solar Energy Collector for Heating Air", Solar Energy, vol. 12, pp. 19–29, Pergamon Press, England, 1968.

Primary Examiner—James C. Yeung
Attorney, Agent, or Firm—Limbach, Limbach & Sutton

[57] ABSTRACT

A solar heat collector panel having an absorber plate with fins as part thereof to reduce convection air currents and heat loss from the panel. A screen disposed above a collector plate also reduces the undesired convection air currents. A fluid carrying pipe is attached to the collector plate by snapping into channels therein after a sealer material has been placed in the channel.

9 Claims, 6 Drawing Figures

SOLAR HEAT COLLECTOR

BACKGROUND OF THE INVENTION

This invention relates generally to an improved solar heat collector panel and methods of manufacturing such panels.

Solar heat collectors are becoming widely used as sources of energy for heating swimming pools, building space and usable hot water. The collector, placed to receive maximum exposure to the sun, generally includes a flat absorber plate with a heat absorbing surface and ducts attached thereto for carrying fluid. The fluid is heated from the heat absorbing surface and then transferred to a heat storage reservoir. Liquid or air can be utilized as the heat transfer medium.

These main components of a solar heat collector are generally located inside an enclosure having a light transparent glazing spaced a distance from the black absorbing surface. The purpose of the cover is to prevent heated air from the vicinity of the absorber from escaping the collector and being lost to the atmosphere. It has been a constant goal in solar collector design to improve their efficiency; that is, to improve the proportion of incident sunlight energy that is converted into usable heat that may be transported to a location where it is desired.

Even with the use of a glazing in a solar collector, its collection efficiency (defined as a ratio of actually collected and primary incident energy) is generally significantly less than unity. This is due, in part, to losses between the heat transfer medium and the lower ambient temperature of the surroundings. Such losses are principally due to air convection in front of the heat absorber which carrier heat away from it to the atmosphere. In the case of solar heat collectors that have no transparent cover (unglazed), convection currents constantly replace the warm heated air adjacent the absorber with cooler ambient air which is then, in turn, heated by the absorber and lost. Where the collector is covered by a light transparent medium (glazed), the convection currents are still present in existing solar collectors and result in transferring heat from the absorber to the cooler glazing. The glazing then transmits this heat by direct conduction to the surrounding atmosphere. Such heat losses are a particular problem for solar domestic water heating, space heating and air conditioning where the temperature of the fluid transfer medium is maintained a great deal above the ambient temperature of the surroundings.

Therefore, it is a principal object of the present invention to provide a solar heat collector construction that results in a higher efficiency utilization of the solar energy incident upon it.

It is another object of the present invention to provide an improved technique for attaching a fluid heat transfer medium carrier to a heat absorber plate.

SUMMARY OF THE INVENTION

These and additional objects are accomplished by the various aspects of the present invention, wherein briefly, a generally flat heat absorber plate is provided as an integral part thereof with upstanding straight fins extending in one direction thereacross. The fins break up natural convection currents within the collector so that a reduced amount of heated air either escapes from an unglazed collector or contacts the glazing of a glazed collector. Utilized in conjunction with the fins, or with a heat collector plate that omits the fins, is a screen positioned between the heat collector and glazing (if any). The screen also functions to restrict travel of the natural convection currents away from the heat absorbing collector plate. The efficiency of the solar collector is thus increased.

In constructing the solar panel, the heat absorbing collector plate is preferably made of extruded aluminum with the carrier for the heat transfer medium, which is usually water, being a copper pipe. Channels are formed in the collector plate into which the copper pipe nests. The opening to the channel is made slightly smaller than the outside diameter of the pipe and the collector plate is made resilient enough so that the pipe can be snapped into place and retained without further fastening. Before urging the copper pipe into the channel, a bead of water impervious sealing material, such as silicon rubber, is placed in the bottom of the channel. When the copper pipe is then positioned in the channel, the sealant spreads out to fill in all voids between the copper pipe and the aluminum channel which aids both in heat transfer and in preventing corrosion.

Additional objects, advantages and features of the various aspects of the present invention are given in the following detailed description of its preferred embodiments, which should be taken in conjunction with the accompanying drawings.

DESCRIPTION OF THE PREFERRED EMBODIMENTS

Figure 1:
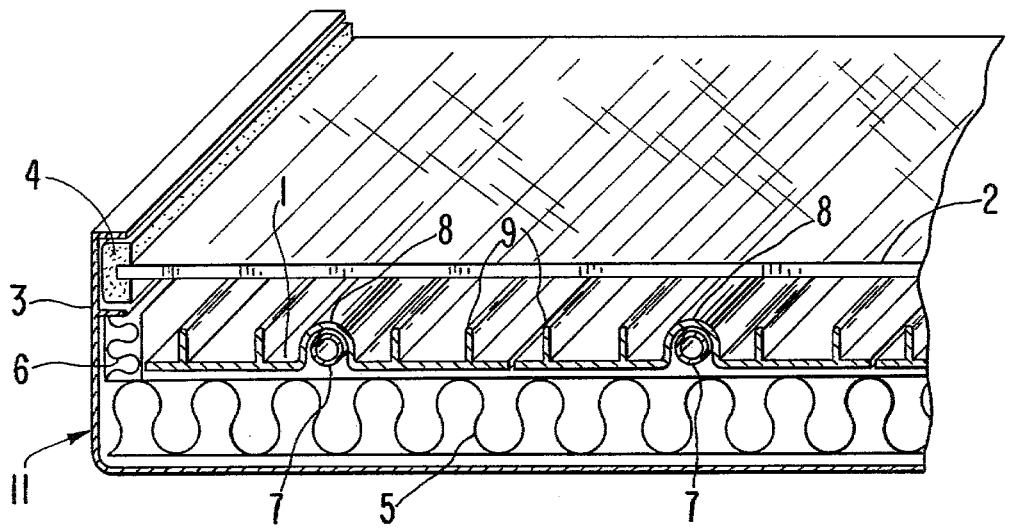
FIG. 1 is a partially cut away view of an embodiment of a solar collector panel utilizing various aspects of the present invention.

Referring to FIG. 1, a solar heat collector is illustrated that utilizes liquid to transfer heat from the collector to the point of use. An absorber plate 1 is preferably made from extruded aluminum. The absorber plate 1 is painted on its top surface for receiving an absorbing radiant energy through a glazing 2, preferably made of clear glass. The absorber plate 1 and the glazing 2 extend in a two dimensional area within a solid metal frame 3 that is generally of a rectangular shape. The glazing 2 is held into the frame 3 by a glazing bead 4. A layer of insulation 5 is positioned beneath the absorber plate 1 and the bottom of the frame 3 to minimize heat losses through the rear of the solar collector plate. Insulation 6 is also provided around the edge of the absorber plate 1.

A fluid carrying round pipe 7 is carried in a channel 8 formed within the collector plate 1. A plurality of such channels and pipes extend across the absorber plate 1 in only one direction in parallel rows. The rows of pipe 7 are then connected at their ends to provide a single path for fluid that runs back and forth across the absorber plate from a single fluid input to a single fluid output. The rows of pipe 7 are preferably formed from a single continuous pipe that is bent at its ends to form the pipe in a serpentine shape.

In between the elongated cavities 8 are disposed several elongated fins 9 that rise from the generally flat base plate region of the absorber 1 as an integral construction. These fins have a principal purpose of reducing the natural conduction currents that tend, in an actual solar installation, to carry heated air from the top surface of the absorber plate 1 to the glazing 2 where the heat can be lost to the surroundings by convection through the glazing 2.

Figure 2:
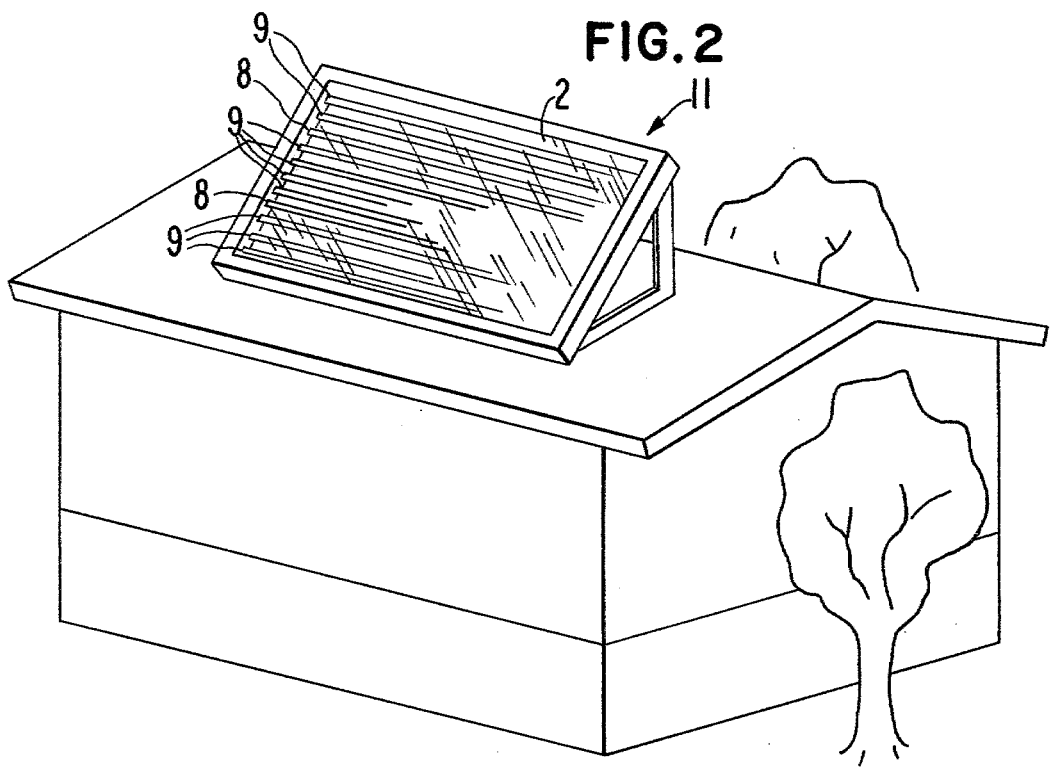
FIG. 2 illustrates generally one particular orientation of the solar panel according to FIG. 1.

The elements described with respect to FIG. 1 form a solar panel 11 which is installed on a building roof top as shown in FIG. 2 in a typical application. The solar collector 11 is tilted upward with respect to the building roof in order to maximize the solar energy that falls upon its two dimensional surface. The collector 11 is oriented with its channels 8 and fins 9 having their long dimension substantially horizontal.

Figure 3:
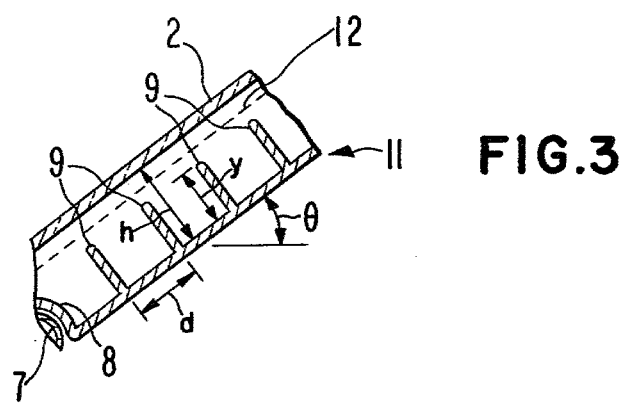
FIG. 3 illustrates schematically a sectional view of the solar panel illustrated in FIGS. 1 and 2.

The preferred fin structure of the collector 11 will now be described with respect to the sectional view of FIG. 3. The angle $\theta$ is the angle that the flat portion of the absorber plate 1 makes with the horizontal in an actual installation. This angle is usually about 45°. The fins 9, making a right angle with the base of the absorber plate 1, are most conveniently of uniform height and spacing. It has been found that the dimensions "d", "h" and "y" as illustrated in FIG. 3 are preferably within the following ranges:
d: from 0.5 inch to 3.0 inch
h: from 0.5 inch to 1.5 inch
y: from 0.25 inch to 1.0 inch
Similarly, it has been found that the optimum ratio of the dimension "h" to the dimension "d" is approximately 1.0. The optimum ratio of the dimension "y" to the dimension "h" is in the range of 0.5 inch to 0.75 inch. The optimum dimensions "d" and "y" are each approximately 1 inch for a solar collector of general application.

It can be seen from FIG. 3 that the fins 9 restrict the natural convection of warm air from the base of the server plate 1 particularly around the fluid carrying pipes 7, to the glazing 2. Heat loss is thus significantly reduced. If the ranges of dimensional parameters stated above are not followed, the fins are likely not to be effective to inhibit these undesired convection currents.

FIG. 3 also shows an optional screen 12 extending over the entire surface area of the solar collector and suspended between the top of the ribs 9 and the underside of the glazing 2. The screen 12 can be selected from ordinary wire mesh screen, clear plastic fiber screen and similar products. It has been found that the existence of the screen 12 also has an inhibiting effect upon the convection currents that tend to rise from the absorber plate 1 to the glazing 2. Screen 12 is drawn taught and fastened around the edges of the frame 3 (not shown.) The screen 12 may be used with the fins 9 as shown in FIG. 3 or may be beneficially utilized even if the fins 9 are not used.

Figure 4:
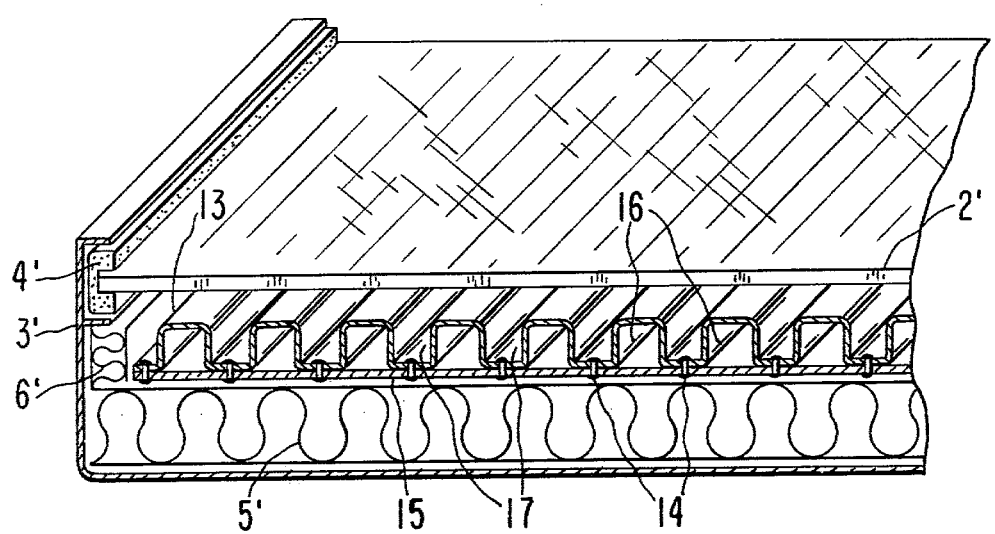
FIG. 4 is a partially cut away view of another embodiment of a solar panel utilizing various aspects of the present invention.

FIG. 4 illustrates a modification of the solar collector panel described above with respect to FIGS. 1-3. Equivalent components are given the same reference characters in FIG. 4 with a prime (') added thereto. The solar collector panel of FIG. 4 is adapted for utilizing air as the heat carrying fluid medium. An absorber plate 13 is attached by connectors 14 to an absorber back plate 15. The result is the formation of a plurality of parallel air carrying channels 16. The channels are preferably connected at the ends of the solar collector (not shown) in a manner to provide a single air channel that traverses back and forth across the solar collector and has a single cool air input and a single hot air output. The channels 16 are formed from equally spaced square undulations of the absorber cover plate 13. Spaces 17 between the hot air carrying channels 16 are made to have dimensions within the range discussed previously with respect to FIG. 3 for fins in order to reduce the heat loss through the glazing by convection air currents. Similarly, a screen (not shown) may be disposed between the top of the absorber plate 13 and the underside of the glazing 2', in a manner discussed with respect to the screen 12 of FIG. 3.

Figure 5A:
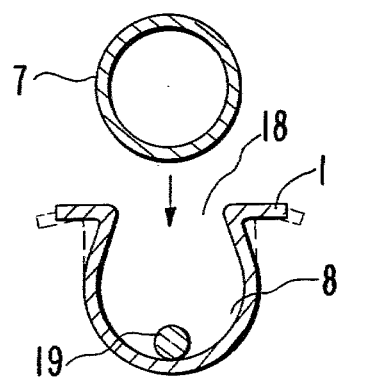
FIGS. 5A and 5B illustrate the technique according to the present invention of assemblying the solar panel illustrated in FIG. 1.
Figure 5B:
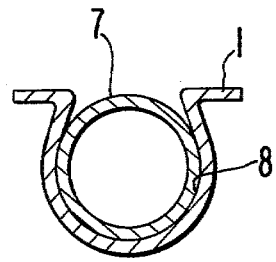

Referring to FIGS. 5A and 5B, a preferred construction and method of forming a portion of the solar collector of FIGS. 1-3 is illustrated. Referring to FIG. 5A, the channel 8 formed from the underside of the absorber plate 1 has an opening 18 thereinto that has a width that is slightly less than the outside diameter of the pipe 7. The material and thickness of the absorber plate 1 is chosen so that the pipe 7 can be forced through the opening 18 into the channel 8 by spreading apart the sides of the opening 18 momentarily. Before forcing the pipe 7 into the channel 8, however, a bead of water impervious moldable material 19, such as silicon rubber, is desposited along the length of the channel 8. Enough of the material 19 is used so that when the pipe 7 is inserted into the channel 8 it spreads around the interface between the outside of the pipe 7 and the walls of the channel 8 to fill all voids. This sealing operation has two purposes. First, the heat transfer between the absorber plate 1 and the liquid carrying pipe 7 is made better if all of the air pockets that might otherwise exist between the two parts in the channel 8 are eliminated. Second, the use of such a sealer prevents moisture from getting inbetween the pipe 7 and the walls of the channel 8 and this prevents electrolysis between the pipe 7, preferably made of copper, and the absorber plate 1, preferably made of aluminum. In order to further reduce the possibility of electrolysis, the pipe 7 is preferably painted on the outside with a black insulating paint prior to its being inserted within the channel 8. Such painting acts to reduce the extent of the area of contact between the copper pipe 7 and the aluminum 1.

Although the various aspects of the present invention have been described with respect to specific embodiments and examples thereof, it will be understood that the invention is entitled to protection within the full scope of the appended claims.

I claim:
1. A solar energy collecting panel, comprising:
a two dimensional heat absorber having a substantially flat bottom,
means in heat contact relationship with said absorber for providing a plurality of fluid conduits thereacross in one direction and substantially parallel to one another,
an enclosure for said absorber and said fluid path means, said enclosure including a heat radiation transparent glazing positioned thereacross in a manner to keep air from escaping from above said absorber,
said absorber including a plurality of fins rising from the substantially flat bottom portion and extending in said one direction along its length substantially parallel to one another, the spacing of said fins being substantially within the range of 0.5 inch to 3.0 inch, the height of each fin being substantially in the range of 0.25 inch to 1.0 inch and the distance between the flat bottom portion of said absorber and said glazing being substantially within the range of 0.5 inch to 1.5 inch, whereby undesired convection air currents within said enclosure are minimized and the efficiency of the collector increased.

2. The solar energy collecting panel according to claim 1 wherein the ratio of distance between the absorber and the glazing to the distance between fins along the absorber flat bottom is substantially equal to one, and further wherein the ratio of the fin height to the distance from the absorber bottom to the glazing lies substantially within a range of 0.5 to 0.75.

3. The solar energy collecting panel according to claim 1 wherein the spacing between said fins and the height of said fins are each substantially one inch.

4. The solar energy collecting panel according to claim 1 which additionally comprises a mesh screen layer disposed between said glazing in the top of said fins.

5. The solar energy collecting panel according to claim 1 wherein the distance between the flat bottom portion of said absorber and said glazing is substantially equal to the spacing between said fins.

6. The solar energy collecting panel according to claim 1, wherein the ratio of the fin height to the distance from the absorber bottom to the glazing lies substantially within a range of 0.5 to 0.75.

7. A solar energy collecting panel installation, comprising:
   a two dimensional heat absorber,
   means in heat contact relationship with said absorber for providing a plurality of fluid conduits thereacross in one direction, and
   an enclosure for said absorber and said fluid path means, said enclosure including a substantially flat heat radiation transparent glazing positioned thereacross in a manner to keep air from escaping from above said absorber,
   said absorber including a plurality of fins rising from a flat bottom portion in an integral construction and extending in said one direction along its length parallel to one another, a ratio of the height of each of said fins to the distance from the absorber bottom to the glazing lies substantially within a range of 0.5 to 0.75, and a ratio of a distance between the absorber bottom and the glazing to the distance between fins along the absorber flat bottom is substantially equal to one, and
   means for mounting the collecting panel with its absorber at a finite angle with horizontal but with said fins extending substantially horizontally, whereby undersired convection air currents within said enclosure are minimized and the efficiency of the collector increased.

8. The solar energy collecting panel installation according to claim 7, wherein said finite angle is substantially forty-five degrees.

9. A solar energy collecting panel, comprising:
   a two-dimensional heat absorber having a substantially flat bottom,
   means in heat contact relationship with said absorber for providing a plurality of fluid conduits thereacross in one direction and substantially parallel with one another, and
   an enclosure for said absorber and said fluid path means, said enclosure including a substantially flat layer of heat radiation transparent glazing positioned thereacross in a manner to keep air from escaping above said absorber, said absorber including a plurality of fins rising from the substantially flat bottom portion of the absorber toward said glazing and extending in said one direction across the absorber substantially parallel to one another, a distance between the absorber and the glazing being substantially equal to a spacing between said fins, and further wherein the ratio of the fin height to the distance from the absorber bottom to the glazing lies substantially within a range of 0.5 to 0.75 whereby undesired convection air currents within said enclosure are minimized and the efficiency of the collector increased.

* * * * *